(12) United States Patent
Nguyen (10) Patent No.: US 10,751,823 B2
(45) Date of Patent: Aug. 25, 2020

(54) SMART SOLDERING IRON TIP AND METHOD OF AUTHENTICATING SAME

(71) Applicant: OK International, Inc., Cypress, CA (US)

(72) Inventor: Hoa Dinh Nguyen, Cypress, CA (US)

(73) Assignee: OK International, Inc., Cypress, CA (US)

( * ) Notice: Subject to any disclaimer, the term of this patent is extended or adjusted under 35 U.S.C. 154(b) by 72 days.

(21) Appl. No.: 16/216,676

(22) Filed: Dec. 11, 2018

(65) Prior Publication Data

US 2020/0094338 A1  Mar. 26, 2020

Related U.S. Application Data

(63) Continuation-in-part of application No. 16/141,628, filed on Sep. 25, 2018.

(51) Int. Cl.
| | | |
|---|---|---|
| *B23K 3/00* | (2006.01) | |
| *B23K 3/03* | (2006.01) | |
| *B23K 3/02* | (2006.01) | |

(52) U.S. Cl.
CPC .............. *B23K 3/033* (2013.01); *B23K 3/025* (2013.01); *B23K 3/026* (2013.01)

(58) Field of Classification Search
CPC ......... G11C 29/02; G11C 7/04; G11C 7/1057; G11C 29/022; G11C 7/1051; G11C 29/50008; G11C 2207/2254; G11C 5/04; H01L 2924/0002; B23K 3/033; B23K 3/025; B23K 3/02–0392

USPC ............................ 228/8–10, 102–104, 51–55
See application file for complete search history.

(56) References Cited

U.S. PATENT DOCUMENTS

| | | | | |
|---|---|---|---|---|
| 2,517,561 A | * | 8/1950 | Handley | B23K 3/0338 |
| | | | | 219/234 |
| 3,716,692 A | * | 2/1973 | Schick | B23K 3/033 |
| | | | | 219/241 |
| 3,990,623 A | * | 11/1976 | Fortune | B23K 3/027 |
| | | | | 228/57 |
| 4,315,128 A | * | 2/1982 | Matcovich | H01L 24/78 |
| | | | | 219/223 |
| 4,424,930 A | * | 1/1984 | Wilhelmson | B23K 3/025 |
| | | | | 205/118 |
| 4,734,559 A | * | 3/1988 | Fortune | B23K 3/0338 |
| | | | | 219/227 |
| 4,891,497 A | * | 1/1990 | Yoshimura | B23K 3/033 |
| | | | | 219/241 |
| 4,974,768 A | * | 12/1990 | Ebata | B23K 3/025 |
| | | | | 148/403 |

(Continued)

FOREIGN PATENT DOCUMENTS

| | | | | |
|---|---|---|---|---|
| GB | 550333 A | * | 1/1943 | ........... B23K 3/0376 |
| GB | 558634 A | * | 1/1944 | ........... B23K 3/0376 |

(Continued)

*Primary Examiner* — Kiley S Stoner
(74) *Attorney, Agent, or Firm* — Procopio Cory Hargreaves and Savitch LLP (57) ABSTRACT

A smart soldering iron tip of a handheld soldering iron comprises a hollow cylindrical base; a pointed distal end; and a proximal end with an ID feedback device including a conductive material coating, which when read provides authentication information on the smart soldering iron tip.

9 Claims, 7 Drawing Sheets

(56) References Cited

U.S. PATENT DOCUMENTS

| | | | | |
|---|---|---|---|---|
| 5,014,210 A * | 5/1991 | Postlewait | | B23K 3/033 219/241 |
| 5,122,637 A * | 6/1992 | Bottorff | | B23K 3/033 219/229 |
| 5,130,640 A * | 7/1992 | Gambill | | B23K 3/033 324/510 |
| 5,151,574 A * | 9/1992 | Urban | | B23K 3/033 219/241 |
| 5,406,053 A * | 4/1995 | Masreliez | | B23K 3/0315 219/229 |
| 5,495,093 A * | 2/1996 | Griffith | | B23K 3/033 219/233 |
| 5,504,305 A * | 4/1996 | Fischer | | B23K 3/033 219/497 |
| 5,804,795 A * | 9/1998 | Fortune | | B23K 3/0473 219/227 |
| 6,054,678 A * | 4/2000 | Miyazaki | | B23K 3/033 219/229 |
| 6,369,359 B1 * | 4/2002 | Morrison | | B23K 3/0615 219/229 |
| 6,580,050 B1 * | 6/2003 | Miller | | B23K 3/033 219/229 |
| 2002/0179680 A1 * | 12/2002 | Poletaev | | B23K 3/063 228/105 |
| 2004/0065653 A1 * | 4/2004 | Uetani | | B23K 3/025 219/229 |
| 2006/0157466 A1 * | 7/2006 | Miyazaki | | G05D 23/2401 219/227 |
| 2016/0031044 A1 * | 2/2016 | Marino | | H05K 3/225 228/102 |
| 2016/0096232 A1 * | 4/2016 | Marino | | B23K 1/0016 228/9 |
| 2017/0173719 A1 * | 6/2017 | Nguyen | | B23K 31/125 |
| 2019/0047066 A1 * | 2/2019 | Matsuzaki | | B23K 1/018 |
| 2019/0134730 A1 * | 5/2019 | Teraoka | | B23K 3/0323 |
| 2019/0217410 A1 * | 7/2019 | Nguyen | | B23K 3/0478 |
| 2019/0262925 A1 * | 8/2019 | Ebisawa | | B23K 3/0615 |
| 2019/0364668 A1 * | 11/2019 | Nguyen | | B23K 3/025 |

FOREIGN PATENT DOCUMENTS

| | | | | |
|---|---|---|---|---|
| GB | 571093 A | * | 8/1945 | B23K 3/0307 |
| GB | 574392 A | * | 1/1946 | B23K 3/0376 |
| GB | 574498 A | * | 1/1946 | B23K 3/027 |
| GB | 577683 A | * | 5/1946 | B23K 3/0307 |

* cited by examiner

SMART SOLDERING IRON TIP AND METHOD OF AUTHENTICATING SAME

CROSS-REFERENCE TO RELATED APPLICATION

The present application is a continuation-in-part of U.S. patent application Ser. No. 16/141,628, filed Sep. 25, 2018, which is incorporated by reference herein.

FIELD OF THE INVENTION

The present invention relates to soldering iron tips and methods of authenticating soldering iron tips.

SUMMARY OF THE INVENTION

An aspect of the invention involves a handheld soldering iron comprising a power supply; a workstand; a handpiece including a soldering iron tip with an ID feedback device including a conductive material coating, the handpiece coupled to the power supply and the workstand, receiving power from the power supply and heating the soldering iron tip to perform soldering on a work piece, one or more processors programmed to perform steps comprising: reading information on the conductive material coating from the ID feedback device of the soldering iron tip; determining whether the read information on the conductive material coating from the ID feedback device corresponds to authentication information for the soldering iron tip; continuing supply of power to the handheld soldering iron if the read information on the conductive material coating from the ID feedback device corresponds to authentication information for the soldering iron tip; stopping supply of power to the handheld soldering iron if the read information on the conductive material coating from the ID feedback device does not correspond to authentication information for the soldering iron tip.

One or more implementations of the aspect described immediately above include one or more of the following: the soldering iron tip includes an entire proximal surface coated with the conductive material coating; the conductive material coating includes a known electrical resistance, and reading information from the ID feedback connection on the ID feedback device of the soldering iron tip includes reading the resistance of the conductive material coating to ground and determining whether the read resistance of the conductive material coating to ground corresponds to authentication resistance information for the soldering iron tip; the soldering iron tip includes a partial proximal surface coated with the conductive material coating; the partial proximal surface coated with the conductive material coating forms multiple conductive material coating segments; and/or the multiple conductive material coating segments include a known electrical resistance, and reading information from the ID feedback connection on the ID feedback device of the soldering iron tip includes reading the resistance of the multiple conductive material coating segments to ground and determining whether the read resistance of the multiple conductive material coating segments to ground corresponds to authentication resistance information for the soldering iron tip.

Another aspect of the invention involves a method of authenticating a soldering iron tip including an ID feedback device of a handheld soldering iron, the ID feedback device including a conductive material coating, comprising reading information on the conductive material coating from the ID feedback device of the soldering iron tip; determining whether the read information on the conductive material coating from the ID feedback device corresponds to authentication information for the soldering iron tip; continuing supply of power to the handheld soldering iron if the read information on the conductive material coating from the ID feedback connection corresponds to authentication information for the soldering iron tip; stopping supply of power to the handheld soldering iron if the read information on the conductive material coating from the ID feedback connection does not correspond to authentication information for the soldering iron tip.

One or more implementations of the aspect described immediately above include one or more of the following: the soldering iron tip includes an entire proximal surface coated with the conductive material coating; the conductive material coating includes a known electrical resistance, and reading information from the ID feedback connection on the ID feedback device of the soldering iron tip includes reading the resistance of the conductive material coating to ground and determining whether the read resistance of the conductive material coating to ground corresponds to authentication resistance information for the soldering iron tip; the soldering iron tip includes a partial proximal surface coated with the conductive material coating; the partial proximal surface coated with the conductive material coating forms multiple conductive material coating segments; and/or the multiple conductive material coating segments include a known electrical resistance, and reading information from the ID feedback connection on the ID feedback device of the soldering iron tip includes reading the resistance of the multiple conductive material coating segments to ground and determining whether the read resistance of the multiple conductive material coating segments to ground corresponds to authentication resistance information for the soldering iron tip.

A further aspect of the invention involves a soldering iron tip of a handheld soldering iron comprising a hollow cylindrical base; a pointed distal end; a proximal end with an ID feedback device including a conductive material coating, which when read provides authentication information on the soldering iron tip.

One or more implementations of the aspect described immediately above include one or more of the following: the soldering iron tip includes an entire proximal surface coated with the conductive material coating; the conductive material coating includes a known electrical resistance, and reading information from the ID feedback connection on the ID feedback device of the soldering iron tip includes reading the resistance of the conductive material coating to ground and determining whether the read resistance of the conductive material coating to ground corresponds to authentication resistance information for the soldering iron tip; the soldering iron tip includes a partial proximal surface coated with the conductive material coating; the partial proximal surface coated with the conductive material coating forms multiple conductive material coating segments; and/or the multiple conductive material coating segments include a known electrical resistance, and reading information from the ID feedback connection on the ID feedback device of the soldering iron tip includes reading the resistance of the multiple conductive material coating segments to ground and determining whether the read resistance of the multiple conductive material coating segments to ground corresponds to authentication resistance information for the soldering iron tip.

Another aspect of the invention involves a handheld soldering iron comprising a power supply including a processor; a workstand; a handpiece including a soldering iron tip with an ID feedback device, the handpiece coupled to the power supply and the workstand, receiving power from the power supply and heating the soldering iron tip to perform soldering on a work piece, one or more processors programmed to perform steps comprising reading information from the ID feedback device of the soldering iron tip; determining whether the read information from the ID feedback device corresponds to authentication information for the soldering iron tip; continuing supply of power to the handheld soldering iron if the read information from the ID feedback device corresponds to authentication information for the soldering iron tip; and stopping supply of power to the handheld soldering iron if the read information from the ID feedback device does not correspond to authentication information for the soldering iron tip.

One or more implementations of the aspect described immediately above include one or more of the following: the ID feedback device includes one or more inserts of known electrical resistance; and/or the one or more inserts of known electrical resistance include one or more graphite cylinders, and reading information from the ID feedback connection on the ID feedback device of the soldering iron tip includes reading the resistance of the one or more graphite cylinders to ground and determining whether the read resistance of the one or more graphite cylinders to ground corresponds to authentication resistance information for the soldering iron tip.

Another aspect of the invention involves a method of authenticating a soldering iron tip including an ID feedback device of a handheld soldering iron comprising: reading information from the ID feedback device of the soldering iron tip; determining whether the read information from the ID feedback device corresponds to authentication information for the soldering iron tip; continuing supply of power to the handheld soldering iron if the read information from the ID feedback connection corresponds to authentication information for the soldering iron tip; and stopping supply of power to the handheld soldering iron if the read information from the ID feedback connection does not correspond to authentication information for the soldering iron tip.

One or more implementations of the aspect described immediately above include one or more of the following: the ID feedback device includes one or more inserts of known electrical resistance; and/or the one or more inserts of known electrical resistance include one or more graphite cylinders, and reading information from the ID feedback device of the soldering iron tip includes reading the resistance of the one or more graphite cylinders to ground and determining whether the read resistance of the one or more graphite cylinders to ground corresponds to authentication resistance information for the soldering iron tip.

A still further aspect of the invention involves a soldering iron tip of a handheld soldering iron comprising a hollow cylindrical base; a pointed distal end; and a proximal end with an ID feedback device, which when read provides authentication information on the soldering iron tip.

One or more implementations of the aspect described immediately above include one or more of the following: the ID feedback device includes one or more inserts of known electrical resistance; and/or the one or more inserts of known electrical resistance include one or more graphite cylinders, the resistance to ground of which when read corresponds to authentication resistance information for the soldering iron tip.

DETAILED DESCRIPTION OF THE INVENTION

With reference to FIGS. 1-6, an embodiment of a smart soldering iron tip 10 and method of authenticating the smart soldering iron tip 10 (e.g., to ensure that the smart soldering iron tip 10 is of known high quality and not a low-quality counterfeit) will be described after first describing an embodiment of a handheld soldering iron 20.

Figure 1:
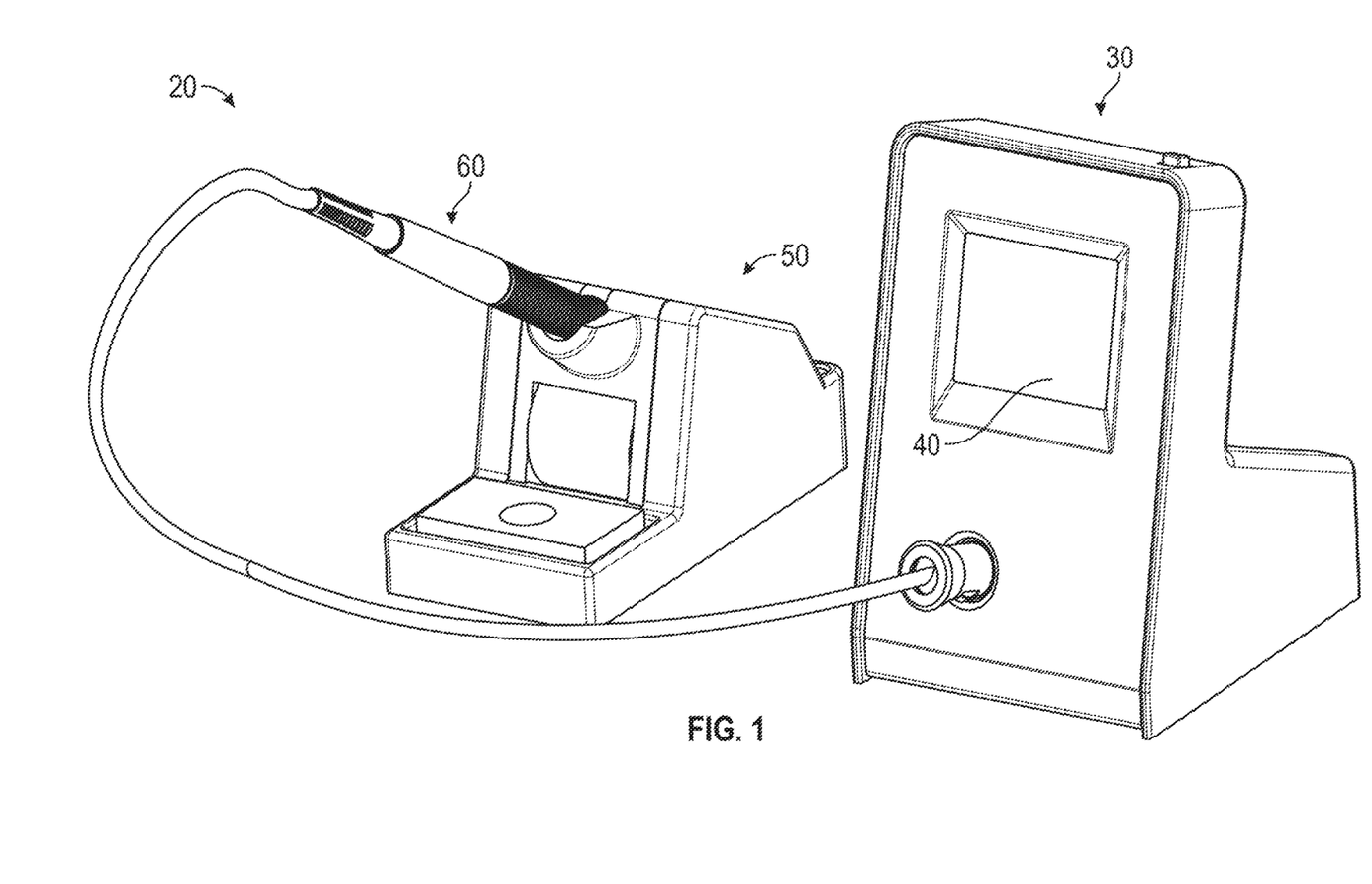
FIG. 1 is a perspective view of an embodiment of a handheld soldering iron.

With reference to FIG. 1, the handheld soldering iron 20 includes a power supply 30 with a display 40, a workstand 50, and a handpiece 60. The handpiece 60 is coupled to the power supply 30 and the workstand 50 that accommodates the handpiece 60. The handpiece 60 receives power from the power supply 30 and heats the smart soldering iron tip 10 to melt solder to perform the soldering on a work piece.

Figure 2:
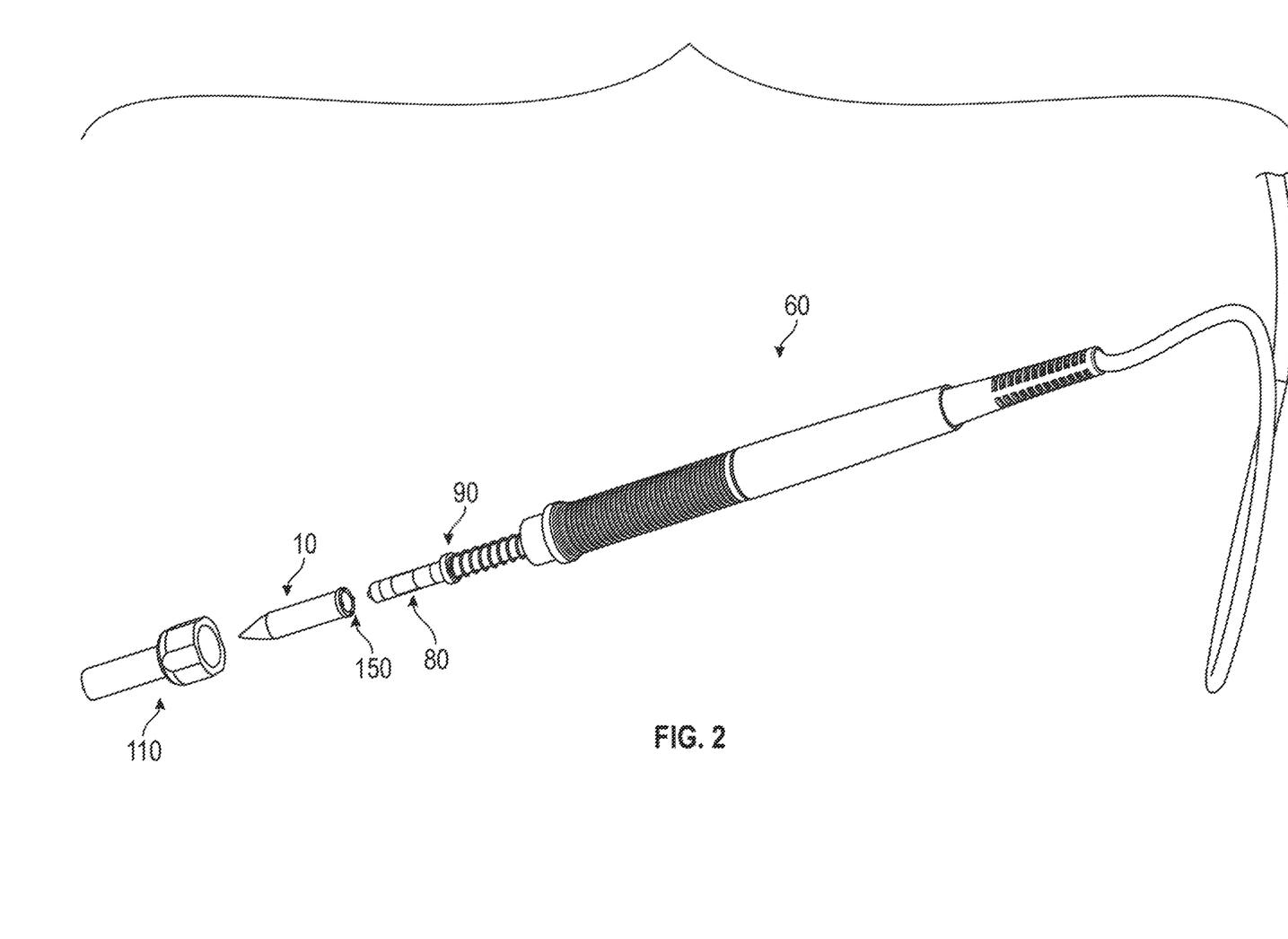
FIG. 2 is a perspective view of an embodiment of a handpiece of the handheld soldering iron of FIG. 1.
Figure 3:
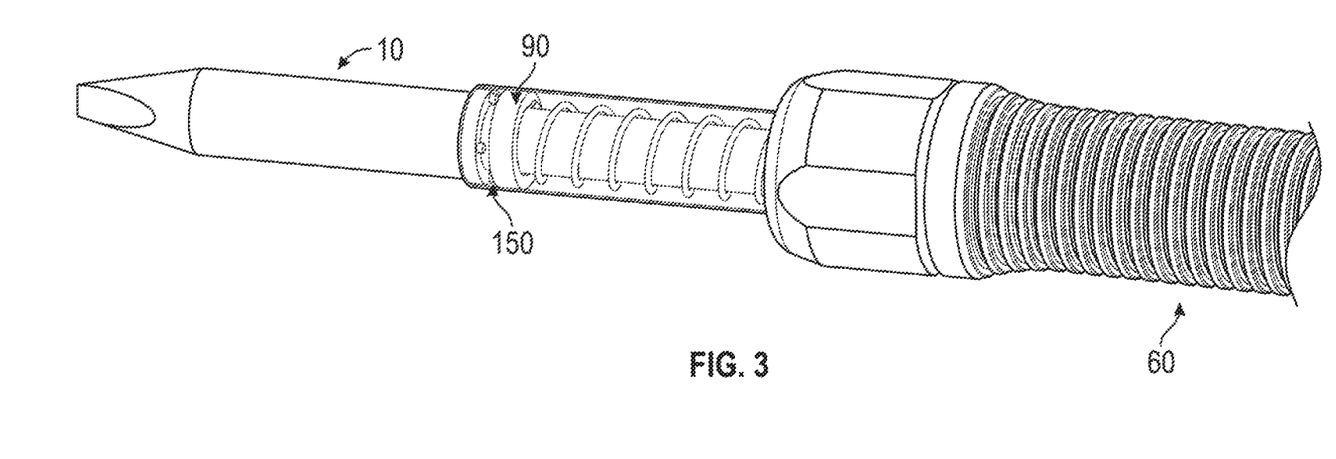
FIG. 3 is a perspective view of an end of the handpiece of FIG. 2 and shows an embodiment of a smart soldering iron tip at the end of the handpiece.
Figure 4A:
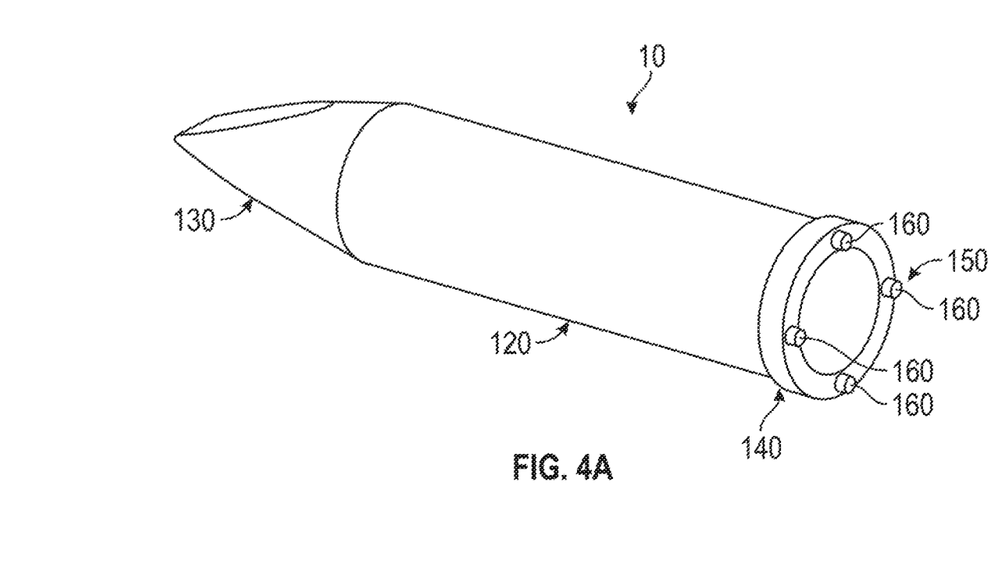
FIG. 4A is a perspective view of the smart soldering iron tip of FIG. 3.

With reference to FIGS. 2-4, the handpiece 60 carries a heater assembly 80, an authenticity identification ("ID") feedback connection 90, and a temperature sensor 100 thermally coupled to the smart soldering iron tip 10 to sense the tip temperature and transmit that data to a processor (e.g., such as processor 560 illustrated in FIG. 7, which is preferably located in the power supply 30, but alternatively or additionally may be located in one or more of the handpiece 60, workstand 50, and another location/element) via temperature sensor feedback line 105. The smart soldering iron tip 10 is coupled to the handpiece 60 via a tip retainer 110. The smart soldering iron tip 10 includes a hollow cylindrical base 120, a pointed distal end 130, and a proximal end 140 with an identification ("ID") feedback device 150. In the embodiment of the smart soldering iron tip 10 shown in FIGS. 2-5, the ID feedback device 150 includes one or more inserts such as graphite cylinders 160 embedded into the tip 10, which is made of an iron plated copper core. Each cylinder 160 is connected to the processor of the power supply 30 via authenticity feedback line 170.

Figure 6:
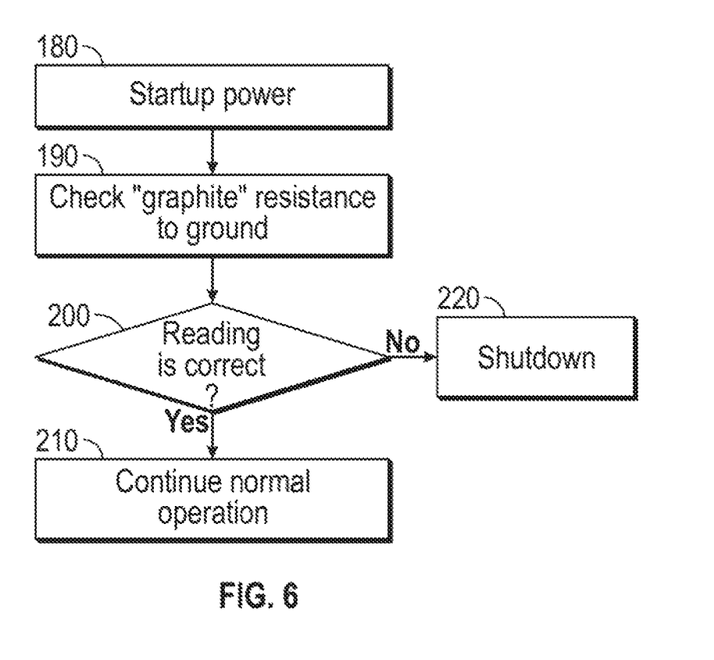
FIG. 6 is a flow chart for an exemplary method of authenticating the smart soldering iron tip.

With reference additionally to FIG. 6, an exemplary method of authenticating the smart soldering iron tip 10 will be described. At step 180, startup power for the handheld soldering iron 20 is supplied to the electronic components carried by the handpiece 60 via power line 175. At step 190, the processor communicates with the ID feedback connection 90, which communicates with the ID feedback device 150 (e.g., reads the resistance of the graphite cylinder(s)

160/checks "graphite" resistance to ground). Then, at step 200, the processor determines whether the tip 10 is authentic or not/checks whether reading is correct. If yes, then control passes on to step 210, and normal operation of the soldering iron 30 continues. If no, then control passes on to step 220, and the soldering iron 30 shuts down.

In alternative embodiments, the ID feedback device 150 and exemplary method of authenticating includes substance (s) other than graphite and/or inserts other than cylinders (e.g., square blocks) for the one or more inserts 160 embedded into the tip 10.

Figure 4B:
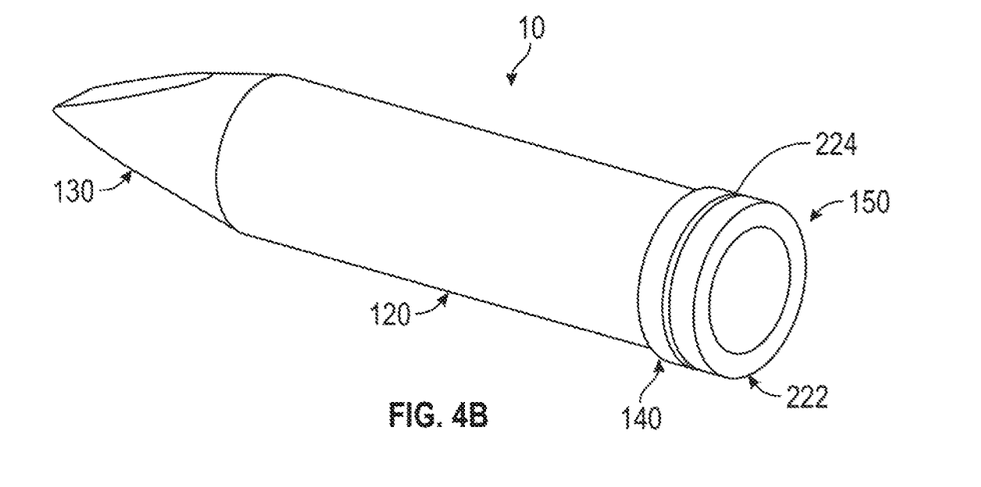
FIG. 4B is a perspective view of another embodiment of a smart soldering iron tip.
Figure 4C:
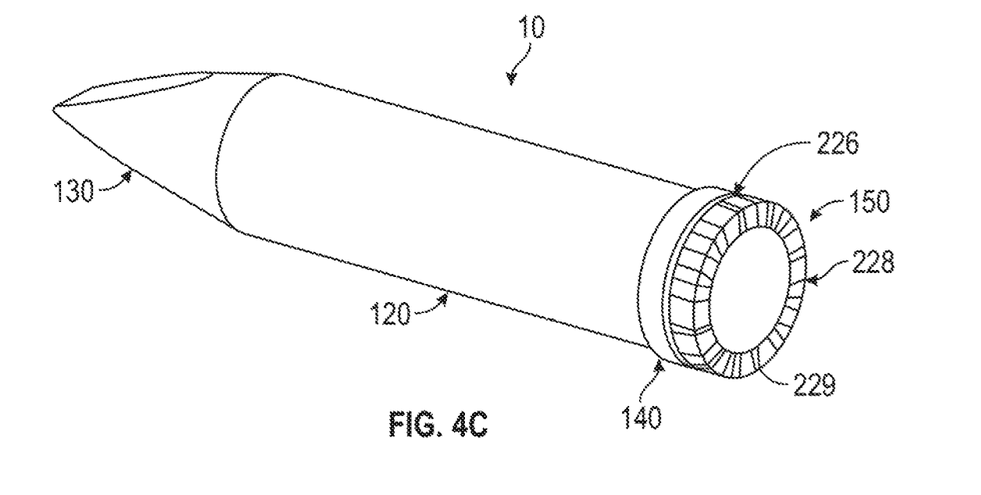
FIG. 4C is a perspective view of a further embodiment of a smart soldering iron tip.
Figure 5:
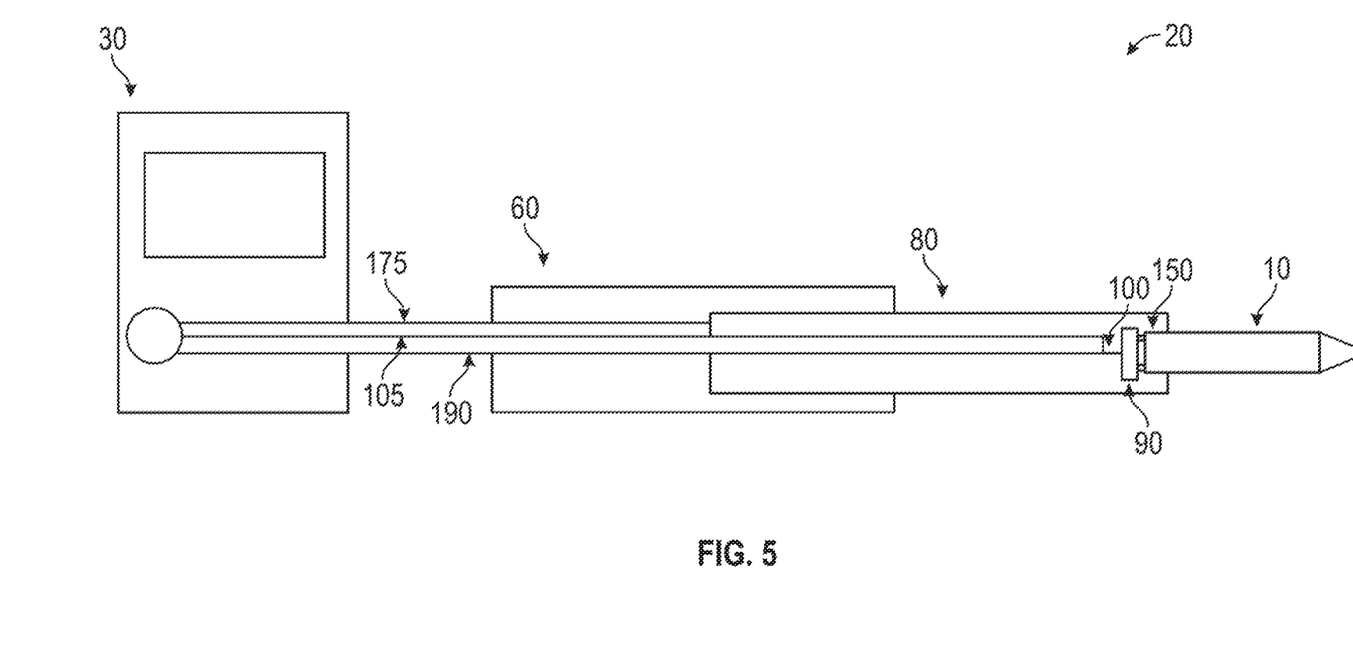
FIG. 5 is a schematic of the handheld soldering iron of FIG. 1.

In further alternative embodiments, as shown in FIGS. 4B and 4C, the inserts 160 of the ID feedback device 150 and exemplary method of authenticating are replaced with conductive material coating 222. In the embodiment of FIG. 4B, an entire proximal surface 224 of the proximal end 140 is coated with the conductive material coating 222. In the embodiment of FIG. 4C, a partial proximal surface 226 of the proximal end 140 is coated with conductive material coating 228 to form, for example, a bar code type of multiple conductive material coating segments 229 for authenticating the tip 10.

Preferably, the ID feedback device 150 includes a resistivity from 5 ohms to $10^6$ ohms per $in^2$. In further embodiments, the ID feedback device 150 includes one or more identifiers other than embedded cylinders 160 or conductive material coating(s) 222, 228 for authenticating the tip 10.

Figure 7:
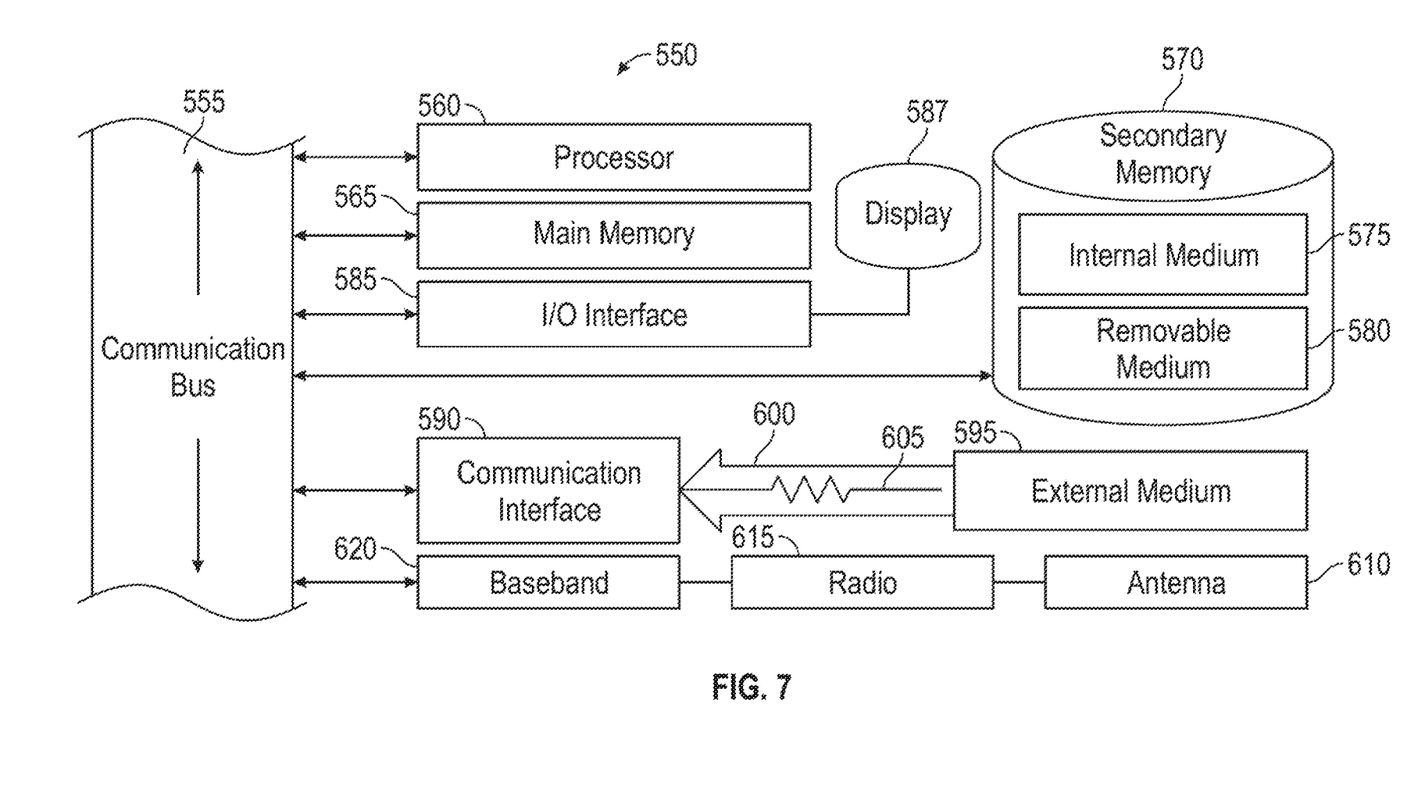
FIG. 7 is a block diagram illustrating an example wired or wireless processor enabled device that may be used in connection with various embodiments described herein.

FIG. 7 is a block diagram illustrating an example wired or wireless system 550 that may be used in connection with various embodiments described herein. For example the system 550 may be used as or in conjunction with the processor in the power supply 30 discussed above with respect to FIGS. 1-6. The system 550 can be a conventional personal computer, computer server, personal digital assistant, smart phone, tablet computer, or any other processor enabled device that is capable of wired or wireless data communication. Other computer systems and/or architectures may be also used, as will be clear to those skilled in the art.

The system 550 preferably includes one or more processors, such as processor 560, which serves as the processor in the power supply 30 discussed above with respect to FIGS. 1-6. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

System 550 preferably includes a main memory 565 and may also include a secondary memory 570. The main memory 565 provides storage of instructions and data for programs executing on the processor 560. The main memory 565 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 570 may optionally include an internal memory 575 and/or a removable medium 580, for example a floppy disk drive, a magnetic tape drive, a compact disc ("CD") drive, a digital versatile disc ("DVD") drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer readable medium having stored thereon computer executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 570. Examples of external storage medium 595 may include an external hard disk drive or an external optical drive, or and external magneto-optical drive.

Other examples of secondary memory 570 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage media 580 and communication interface 590, which allow software and data to be transferred from an external medium 595 to the system 550.

System 550 may also include an input/output ("I/O") interface 585. The I/O interface 585 facilitates input from and output to external devices. For example the I/O interface 585 may receive input from a keyboard or mouse and may provide output to a display 587. The I/O interface 585 is capable of facilitating input from and output to various alternative types of human interface and machine interface devices alike.

System 550 may also include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a modem, a network interface card ("NIC"), a wireless data card, a communications port, a PCMCIA slot and card, an infrared interface, and an IEEE 1394 fire-wire, just to name a few.

Communication interface 590 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

The system 550 also includes optional wireless communication components that facilitate wireless communication over a voice and over a data network. The wireless communication components comprise an antenna system 610, a radio system 615 and a baseband system 620. In the system 550, radio frequency ("RF") signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the present invention as previously described. For example, data storage areas 565 may include various software modules (not shown) that are executable by processor 560.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

While various embodiments of the present invention have been described above, it should be understood that they have been presented by way of example only, and not of limitation. Likewise, the various diagrams may depict an example architectural or other configuration for the disclosure, which is done to aid in understanding the features and functionality that can be included in the disclosure. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent.

As will become apparent to one of ordinary skill in the art after reading this document, the illustrated embodiments and their various alternatives can be implemented without confinement to the illustrated examples.

The invention claimed is:

1. A handheld soldering iron, comprising:
a power supply;
a workstand;
a handpiece including a soldering iron tip with an ID feedback device including a conductive material coating, the handpiece coupled to the power supply and the workstand, receiving power from the power supply and heating the soldering iron tip to perform soldering on a work piece,
one or more processors programmed to perform steps comprising:
reading information on the conductive material coating from the ID feedback device of the soldering iron tip;
determining whether the read information on the conductive material coating from the ID feedback device corresponds to authentication information for the soldering iron tip;
continuing supply of power to the handheld soldering iron if the read information on the conductive material coating from the ID feedback device corresponds to authentication information for the soldering iron tip;
stopping supply of power to the handheld soldering iron if the read information on the conductive material coating from the ID feedback device does not correspond to authentication information for the soldering iron tip,
wherein the soldering iron tip includes a partial proximal surface coated with the conductive material coating that forms multiple conductive material coating segments having a known electrical resistance, and reading information from the ID feedback connection on the ID feedback device of the soldering iron tip includes reading the resistance of the multiple conductive material coating segments to ground and determining whether the read resistance of the multiple conductive material coating segments to ground corresponds to authentication resistance information for the soldering iron tip.

2. The handheld soldering iron of claim 1, wherein the soldering iron tip includes an entire proximal surface coated with the conductive material coating.

3. The handheld soldering iron of claim 2, wherein the conductive material coating includes a known electrical resistance, and reading information from the ID feedback connection on the ID feedback device of the soldering iron tip includes reading the resistance of the conductive material coating to ground and determining whether the read resistance of the conductive material coating to ground corresponds to authentication resistance information for the soldering iron tip.

4. A method of authenticating a soldering iron tip including an ID feedback device of a handheld soldering iron, the ID feedback device including a conductive material coating, comprising:
  reading information on the conductive material coating from the ID feedback device of the soldering iron tip;
  determining whether the read information on the conductive material coating from the ID feedback device corresponds to authentication information for the soldering iron tip;
  continuing supply of power to the handheld soldering iron if the read information on the conductive material coating from the ID feedback connection corresponds to authentication information for the soldering iron tip;
  stopping supply of power to the handheld soldering iron if the read information on the conductive material coating from the ID feedback connection does not correspond to authentication information for the soldering iron tip,
  wherein the soldering iron tip includes a partial proximal surface coated with the conductive material coating that forms multiple conductive material coating segments having a known electrical resistance, and reading information from the ID feedback connection on the ID feedback device of the soldering iron tip includes reading the resistance of the multiple conductive material coating segments to ground and determining whether the read resistance of the multiple conductive material coating segments to ground corresponds to authentication resistance information for the soldering iron tip.

5. The method of claim 4, wherein the soldering iron tip includes an entire proximal surface coated with the conductive material coating.

6. The method of claim 5, wherein the conductive material coating includes a known electrical resistance, and reading information from the ID feedback connection on the ID feedback device of the soldering iron tip includes reading the resistance of the conductive material coating to ground and determining whether the read resistance of the conductive material coating to ground corresponds to authentication resistance information for the soldering iron tip.

7. A soldering iron tip of a handheld soldering iron, comprising:
  a hollow cylindrical base;
  a pointed distal end;
  a proximal end with an ID feedback device including a conductive material coating, which when read provides authentication information on the soldering iron tip,
  wherein the soldering iron tip includes a partial proximal surface coated with the conductive material coating that forms multiple conductive material coating segments having a known electrical resistance, and reading information from the ID feedback connection on the ID feedback device of the soldering iron tip includes reading the resistance of the multiple conductive material coating segments to ground and determining whether the read resistance of the multiple conductive material coating segments to ground corresponds to authentication resistance information for the soldering iron tip.

8. The soldering iron tip of claim 7, wherein the soldering iron tip includes an entire proximal surface coated with the conductive material coating.

9. The soldering iron tip of claim 8, wherein the conductive material coating includes a known electrical resistance, and reading information from the ID feedback connection on the ID feedback device of the soldering iron tip includes reading the resistance of the conductive material coating to ground and determining whether the read resistance of the conductive material coating to ground corresponds to authentication resistance information for the soldering iron tip.

* * * * *